UNITED STATES PATENT OFFICE.

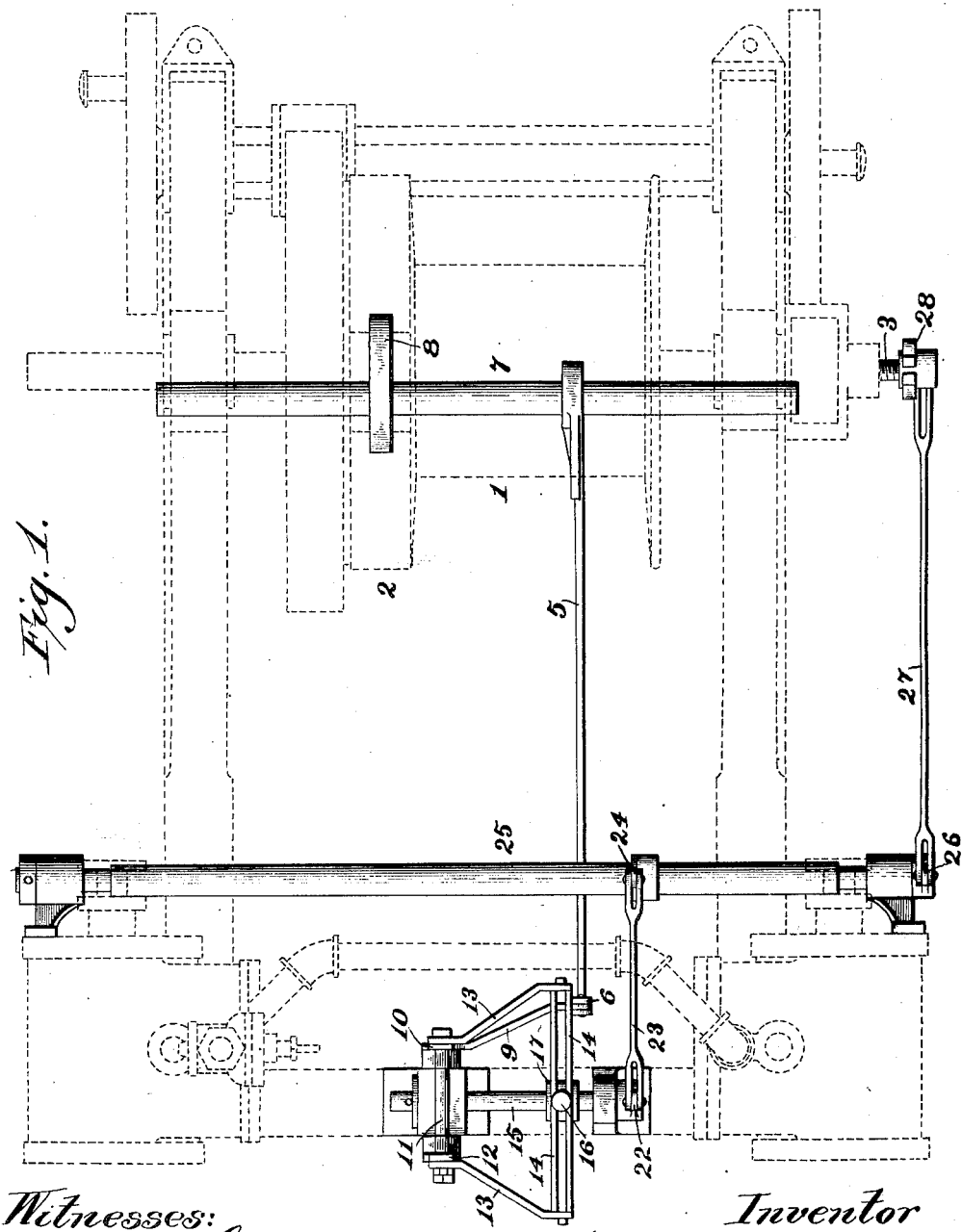

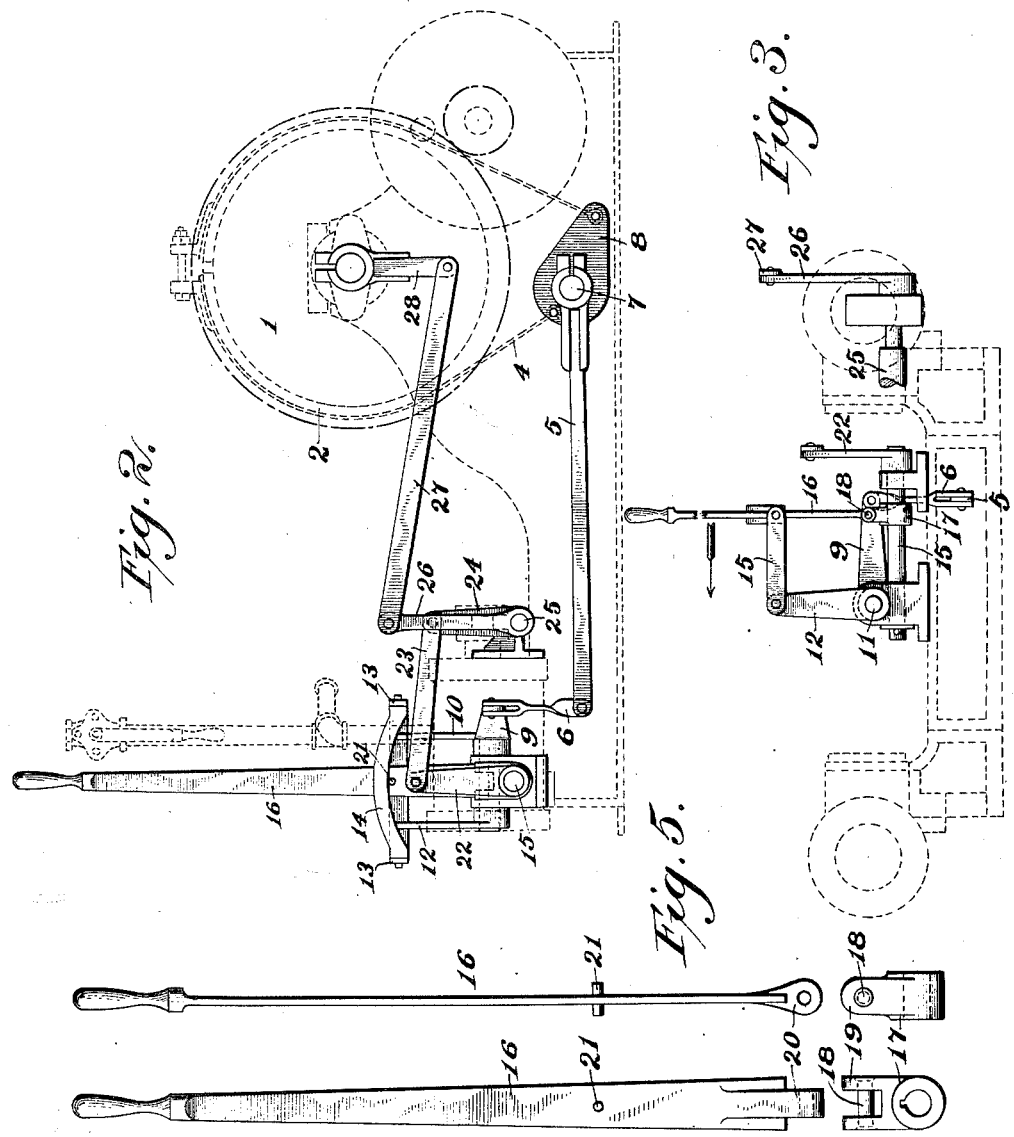

HARRY N. COVELL, OF BROOKLYN, NEW YORK, ASSIGNOR TO LIDGERWOOD MANUFACTURING COMPANY, A CORPORATION OF NEW YORK.

COMBINED BRAKE AND FRICTION OPERATING MECHANISM.

SPECIFICATION forming part of Letters Patent No. 718,916, dated January 20, 1903.

Application filed March 6, 1901. Serial No. 50,040. (No model.)

*To all whom it may concern:*

Be it known that I, HARRY N. COVELL, a citizen of the United States, and a resident of New York city, borough of Brooklyn, in the county of New York and State of New York, have invented a new and Improved Combined Brake and Friction Operating Mechanism, of which the following is a full, clear, and exact description.

In the operation of friction rope-drum engines for many purposes it is necessary not merely that the friction-clutch and the brake should be set alternately but that they should be sometimes set simultaneously, the relative hardness with which they are set being susceptible of such degrees of variation that the power of either one may be caused to preponderate over the power of the other to any degree required. Heretofore to secure these conditions it has been customary for the operator to have two hand-levers, one for controlling the friction-clutch and the other for controlling the friction-brake.

The primary object of my present invention is to combine with a rope-drum and its friction-clutch and brake a single hand-lever and interposed mechanism whereby either of the conditions above referred to can be accomplished by a movement of said single lever. In the particular form of said interposed mechanism which I prefer for carrying out said primary feature of my invention I have also produced what I believe to be a novel device which may find useful application for controlling other kinds of machinery than the combined brake and friction-clutch above alluded to.

Reference is to be had to the accompanying drawings, forming a part of this specification, in which similar characters of reference indicate corresponding parts in all the figures.

Figure 1 is a plan view showing the parts which comprise my invention in full lines and the connected parts of a hoisting-engine in dotted lines. Figs. 2 and 3 are similar views showing the device in side and end elevation, respectively. Figs. 4 and 5 are detail views showing the operating-lever, the two parts of the lever being slightly separated to better show their construction.

The particular construction and the position of the parts illustrated in the accompanying drawings are given as illustrating the form which is now preferred by me, although I am aware that the details of construction, as well as the location and other points of this sort, might be materially changed without in the least altering the scope of my invention. I do not, therefore, wish to be limited to the exact construction herein shown and described.

In operating hoisting-engines it is common to use the friction driving mechanism for turning the drum from a constantly-rotating power-shaft. It is also common to apply to such drums a brake of some sort, so that the load may be held or lowered thereby. The form of friction mechanism and brake used is immaterial to my invention, as it may be employed in connection with any of the ordinary forms of friction driving devices and brakes.

In the drawings, 1 represents the friction-drum, and 2 the surface of the drum, to which the band-brake is applied. The band-brake 4 is shown best in Fig. 2 and is connected at different distances from the pivot-shaft 7 to opposite ends of an arm 8, which is secured to said shaft. To this same shaft is secured a lever 5, said parts corresponding with the parts ordinarily used in connection with a band-brake.

The friction driving device herein indicated is illustrated only in part, as the same forms no part of my present invention.

The form of friction-applying device indicated is that which is most commonly used in devices of this character and employs a threaded shaft 3, which enters the shaft of the drum and which is slightly rotated in order to apply the friction. The shaft 3 is provided with a lever, as 28, which is connected, by means of links or other suitable mechanism, to a lever which is operated by the attendant. In some cases a handle is placed direct upon the lever 28. This, however, is immaterial. In such cases as that herein illustrated, wherein it is desired to operate the friction from a distant point, this lever is connected, by means of links, as the link 27, to a lever located at the point desired.

In the construction herein shown the operating-lever is placed between the engine-cylinders. The lever herein employed is shown in detail in Figs. 4 and 5 and consists of two parts, the body thereof, 16, being pivoted to the section 17, which in turn is keyed upon a short shaft 15, said shaft forming the main pivot of the lever. The section 17 is provided with two jaws 19, between which the ear 20, which is formed upon the lower end of the main part of the lever, enters, and is pivoted thereto by means of the pivot 18, which extends at right angles to the shaft 15, upon which the lever as a whole is pivoted. It is thus evident that the body of the lever may be moved in any direction desired. The shaft 15 is mounted in any suitable way upon the framework of the machine and has an arm 22 secured thereto, said arm being connected, by means of a link 23, with an arm 24, which is secured to a rock-shaft 25, extending across the machine or parallel with the shaft 15. The rock-shaft 25 is provided with a second arm 26, which is connected, by means of the link 27, with the arm 28, connected with the screw-shaft 3, by which the friction is applied. A movement of the lever 16 toward or from the drum will thus cause a corresponding movement of the lever 28, and thus apply or release the friction.

Mounted upon the frame at right angles to the shaft 15 is a pivot-shaft 11, to which are secured two levers 10 and 12, the lever 10 being a bell-crank lever and having an arm 9 extending horizontally and connected with one end of a link 6, the other end of said link being connected with one end of the brake-lever 5. To the upper ends of the levers 10 and 12 are connected links 13, to the other end of which is pivotally connected a pair of guide-bars 14, one of which lies at each side of the lever 16. These guide-bars are herein shown as being curved, so as to form a sort of segment. They are supported by means of a pin 21, which passes through the lever 16. It is evident that a movement of the lever 16 toward one side or the other of the engine will cause the rocking of the levers 10 and 12, and thereby cause the movement of the brake-lever up or down.

By means of the jointed or two-part lever herein shown it is possible to operate either the friction or the brake, as desired, or to operate both at once. For instance, a backward movement of the lever from the normal will apply the friction driving device to turn the drum and a forward movement will close it. This movement may be given without in the least affecting the brake, as the lever will move back and forth between the guide-bars 14 without causing the levers 10 and 12 to be moved from their normal position. In the same way the lever 16 may be moved in a plane at right angles to the one just mentioned or from one side of the machine to the other without in the least affecting the shaft 15, and therefore without affecting the friction driving device, or if it is desired to apply both the friction driving device and the brake at once this may be done by moving the lever backward and to one side or in a diagonal line. In the same way the lever may be moved backward and to the other side, so as to apply the friction driving device while at the same time releasing the brake, or by being moved forward and to one side may release the friction driving device and apply the brake.

It is possible to construct a lever which may be operated in a similar manner of a single part by forming a ball-and-socket joint for the pivot end thereof and connecting the brake and friction operated mechanisms to the lever direct. This, however, is a substantial equivalent of the device herein shown when broadly considered.

The rockers 9 and 22 may be considered, broadly, as members, respectively, of the brake and clutch operating mechanisms, which members vibrate in coördinate planes. The hand-lever 16 is so mounted as to have freedom of movement in planes which are severally either parallel to said coördinate planes, respectively, or diagonal thereto, the relative hardness of application of the brake and clutch being determined by the angle which such diagonal plane of movement of the hand-lever makes with said coördinate planes.

It is evident that the mechanism herein shown may be applied for operating a clutch mechanism and a brake mechanism upon other machines than hoisting-engines. I do not, therefore, wish to be limited to the use of my invention upon hoisting-engines only.

In the claims which are attached hereto the omission of any element or the omission to qualify any element is to be taken as a specific declaration that the element or qualification omitted is not essential to the combination therein sought to be covered.

Having thus fully described my invention, I claim as new and desire to secure by Letters Patent—

1. In combination, a clutch, a brake, a drum controlled by the conjoint action thereof, two members mounted to vibrate in coördinate planes, operative connections between said members and said clutch and brake respectively, a hand-lever having freedom of movement in planes diagonal to said coördinate planes and operative connections between said lever and both of said vibrating members.

2. In a duplex controlling mechanism, in combination, two coördinate shafts 11 and 15, connections whereby the same are respectively operatively connected with the controlled devices, a lever 16 fixed to said shaft 15, a guideway for said lever extending transversely to said shaft, and connections whereby said shaft 11 is moved by the vibrations of said guideway.

3. In a duplex controlling device, in combination, the shaft 15, the jointed hand-lever fixed thereon in such position that the pivot of said joint is transverse to said shaft, the guideway 14 also transverse to said shaft, the shaft 11 carrying the operating-lever 12 and a connection whereby said guideway is mounted upon said lever 12.

4. In a duplex controlling device, in combination the coördinate shafts 11 and 15, the rockers 9 and 22 fixed on said shafts respectively, the levers 12 and 16 by which said shafts are respectively operated and a guideway 14 mounted upon said lever 12 and engaging said lever 16.

HARRY N. COVELL.

Witnesses:
    CHAS. D. BUTLER,
    CHAS. C. PIERCE.